(12) United States Patent
Welchko et al.

(10) Patent No.: US 7,880,425 B2
(45) Date of Patent: Feb. 1, 2011

(54) ELECTRIC MOTOR DRIVE SYSTEMS, MOTOR VEHICLES, AND METHODS OF PHASE CURRENT REGULATION

(75) Inventors: Brian A. Welchko, Torrance, CA (US); Steven E. Schulz, Torrance, CA (US); Silva Hiti, Redondo Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 496 days.

(21) Appl. No.: 11/944,793

(22) Filed: Nov. 26, 2007

(65) Prior Publication Data

US 2009/0134835 A1    May 28, 2009

(51) Int. Cl.
   *H02P 27/00* (2006.01)
(52) U.S. Cl. ............. 318/722; 318/400.02; 318/400.04; 318/400.2; 318/715
(58) Field of Classification Search ................. 318/801, 318/400, 400.2, 715, 720, 721, 254.1, 700, 318/400.02, 400.04, 400.27, 400.28, 400.29, 318/717, 722
   See application file for complete search history.

(56) References Cited

U.S. PATENT DOCUMENTS

| | | | | |
|---|---|---|---|---|
| 5,854,548 A | * | 12/1998 | Taga et al. | ................. 318/721 |
| 5,952,810 A | * | 9/1999 | Yamada et al. | ............... 318/700 |
| 5,969,496 A | * | 10/1999 | Yamada et al. | ............... 318/715 |
| 6,008,618 A | * | 12/1999 | Bose et al. | ................... 318/811 |
| 6,051,946 A | * | 4/2000 | Yamada et al. | ............... 318/432 |
| 6,188,196 B1 | * | 2/2001 | Koide et al. | ................. 318/700 |
| 7,126,514 B2 | * | 10/2006 | Kohara | ........................ 341/141 |
| 7,560,897 B2 | * | 7/2009 | Watanabe | ................... 318/811 |

OTHER PUBLICATIONS

Chinese Office Action dated Jul. 19, 2010, for Application No. 200810179737.

* cited by examiner

*Primary Examiner*—Walter Benson
*Assistant Examiner*—Thai Dinh
(74) *Attorney, Agent, or Firm*—Ingrassia Fisher & Lorenz, P.C.

(57) ABSTRACT

In various embodiments, an electric motor drive system (400, FIG. 4) and a motor vehicle (1000, FIG. 10) include an inverter (404, FIG. 4) adapted to generate (604, FIG. 6), based on inverter control inputs, a number, N, of phase current waveforms (118, FIG. 1), and a phase current sampling apparatus (408, FIG. 4) having a same number, N, of current sensors (502, 503, 504, FIG. 5). Each of the current sensors is adapted to receive one of the phase current waveforms, and the current sensors are adapted simultaneously to sample the phase current waveforms and to generate digital values representing amplitudes of the phase current waveforms. The system and motor vehicle also include a controller (410, FIG. 4) adapted to receive the digital values, to perform an evaluation of the digital values, and to generate the inverter control inputs (462, FIG. 4) based on the evaluation.

17 Claims, 6 Drawing Sheets

ELECTRIC MOTOR DRIVE SYSTEMS, MOTOR VEHICLES, AND METHODS OF PHASE CURRENT REGULATION

TECHNICAL FIELD

The inventive subject matter generally relates to apparatus and methods for regulating phase currents for electric motors, and more particularly relates to such apparatus and methods incorporated into electric motor drive systems and motor vehicles.

BACKGROUND

Electric motor drive systems, which include power electronic inverters, commonly are used to produce and control the phase currents supplied to electric motors. For example, power electronic inverters may be used to control the torque and speed output of alternating current (AC) motors in electric vehicles and hybrid electric vehicles (HEVs). Accurate determination of the phase currents assists in achieving high performance torque regulation. Accordingly, in a digitally-controlled system, high performance current sensors (e.g., analog-to-digital (A-to-D) converters) often are used to obtain measurements of the phase currents. In a three-phase system, only two of the phase currents are independent quantities. Accordingly, it is common only to measure two of the phase currents and to derive the third phase current. For this reason, traditional electric motor drive systems utilize two current sensors to obtain phase current measurements, and values for the third phase current are calculated, as will be described in more detail below.

Because the sensed phase currents may have an offset component, some traditional systems take an initial measurement of the phase currents prior to starting the motor drive system's operations. The measurement may be stored as an initial offset current, $i_{offset}$, which indicates the initial current conditions of the current sensors. During operations, an approximation of the AC portion of a phase current, $i_{control}$, may be calculated by subtracting the offset current from the measured current, $i_{measured}$, as shown in Equation 1 (Equ. 1):

$$i_{control} = i_{measured} - i_{offset} \qquad \text{Equ. 1}$$

The phase current approximation, $i_{control}$, is the quantity that is analyzed in performing torque regulation. The phase current approximation technique given by Equ. 1 yields a representation of the motor phase currents that may facilitate high performance torque and speed control in some situations. However, using Equ. 1, the accuracy of the approximation of $i_{control}$ may be compromised when $i_{offset}$ changes significantly during operations. Such changes may occur, for example, due to significant changes in the system operating conditions, such as substantial changes in ambient operating temperature conditions from the conditions that were initially present. Substantial ambient operating temperature variations commonly occur during a motor vehicle driving cycle, for example, and these temperature variations may affect the current sensor measurements and, thus, the actual offset current. In other words, the actual offset current may "drift" during operations, from the value of the initial offset current, $i_{offset}$. The phenomenon of offset current drift is commonly experienced, for example, by open loop types of current sensors, although closed loop types of current sensors also may experience offset current drift.

Torque control of three-phase AC motors may be based on a two-axis model of the electric motor. Because only two of the phase currents are independent quantities in a three-phase system, as mentioned above, it is common only to measure two of the phase currents, and to derive the third phase current. For example, if the phase a current, $i_a$, and the phase b current, $i_b$, are measured, the phase c current, $i_c$, may be derived according to Equ. 2 as:

$$i_c = -(i_a + i_b) \qquad \text{Equ. 2}$$

The two-axis, reference frame currents, $i_\alpha$ and $i_\beta$, may be calculates according to Equ. 3 as:

$$\begin{bmatrix} i_\beta \\ i_\alpha \end{bmatrix} = 2/3 \begin{bmatrix} 0 & \frac{\sqrt{3}}{2} & -\frac{\sqrt{3}}{2} \\ 1 & \frac{-1}{2} & \frac{-1}{2} \end{bmatrix} \begin{bmatrix} i_a \\ i_b \\ i_c \end{bmatrix} \qquad \text{Equ. 3}$$

And the synchronous frame currents, $i_d$ and $i_q$, may be calculated according to Equ. 4 as:

$$\begin{bmatrix} i_d \\ i_q \end{bmatrix} = \begin{bmatrix} \cos\theta_e & \sin\theta_e \\ -\sin\theta_e & \cos\theta_e \end{bmatrix} \begin{bmatrix} i_\alpha \\ i_\beta \end{bmatrix} \qquad \text{Equ. 4}$$

FIG. 1 is a chart illustrating three, sinusoidal phase currents 102, 103, 104. Axis 106 represents electrical position, in degrees, and axis 108 represents amplitude. Phase current 102 may represent a measured phase a current, $i_a$, phase current 103 may represent a measured phase b current, $i_b$, and phase current 104 may represent a calculated phase c current, $i_c$. In FIG. 1, about a 5% positive offset drift is shown to be present in the measured values for the phase a and b currents, 102, 103, as indicated by the upwardly shifted position of the phase a and b currents 102, 103. Because the phase c current 104 is calculated based on the measured phase a and b currents 102, 103 (e.g., using Equ. 1 and 2, above), the phase c current 104 reflects about a 10% negative offset drift, as indicated by the downwardly shifted position of the phase c current 104. This downward shift affects the calculation of the reference frame currents, $i_\alpha$ and $i_\beta$, as is illustrated in FIG. 2, which in turn affects the calculation of the synchronous frame currents, $i_d$ and $i_q$, as is illustrated in FIG. 3.

FIG. 2 is a chart illustrating reference frame currents 202, 203, $i_\alpha$ and $i_\beta$, respectively, which are calculated based on the measured and calculated phase currents 102-104 illustrated in FIG. 1 (e.g., using Equ. 3, above). As FIG. 2 illustrates, the reference frame currents 202, 203 include a wobble, as indicated by reference frame current 203 being slightly elevated, with respect to reference frame current 202. FIG. 3 is a chart illustrating synchronous frame currents 302, 303, $i_d$ and $i_q$, respectively, which are calculated based on the reference frame currents 202, 203 illustrated in FIG. 2 (e.g., using Equ. 4, above). For an ideal system without any offset drift, the synchronous frame currents, $i_d$ and $i_q$, would be purely direct current (DC) quantities. However, as FIG. 3 illustrates, the synchronous frame currents 302, 303 include a significant non-fundamental DC component.

A high performance, current regulated, electric motor drive system attempts to regulate the synchronous frame currents to DC quantities. In traditional systems, the presence of an offset drift will have the effect of producing a non-fundamental component in the synchronous frame currents (e.g., as illustrated in FIG. 3), which will be reflected back into the actual phase currents. Any non-fundamental component in the actual phase currents produces an undesirable torque ripple, which may adversely affect system performance.

High performance drives benefit from precise sampling determination of motor phase currents for purposes of torque control, even in the face of significant offset drifts, which may occur during operations. Accordingly, it is desirable to provide apparatus and methods to compensate adequately for offset drifts that may detrimentally affect the phase currents, and thus the performance, of an electric motor. Furthermore, other desirable features and characteristics of the inventive subject matter will become apparent from the subsequent detailed description and the appended claims, taken in conjunction with the accompanying drawings and the foregoing technical field and background.

BRIEF SUMMARY

In an embodiment, an electric motor drive system is provided, which includes an inverter, a phase current sampling apparatus, and a controller. The inverter is adapted to generate, based on inverter control inputs, a number, N, of phase current waveforms. The phase current sampling apparatus has a same number, N, of current sensors. Each of the current sensors is adapted to receive one of the phase current waveforms. The current sensors are adapted simultaneously to sample the phase current waveforms and to generate digital values representing amplitudes of the phase current waveforms. The controller is adapted to receive the digital values representing the amplitudes of the phase current waveforms, to perform an evaluation of the digital values, and to generate the inverter control inputs based on the evaluation.

In another embodiment, a motor vehicle includes an electric motor and an electric motor drive system as described in the previous paragraph. The electric motor is adapted to receive a number, N, of phase current waveforms and to provide torque in response to the multiple phase current waveforms. The inverter of the electric motor drive system is adapted to generate, based on inverter control inputs, a same number, N, of phase current waveforms.

In another embodiment, a method is provided for regulating phase current waveforms. The method is performed by an electric motor drive system and includes the steps of an inverter generating, based on inverter control inputs, a number, N, of phase current waveforms. The method also includes generating, by a same number, N, of current sensors, the same number, N, of simultaneous phase current waveform samples at a plurality of sampling instants, resulting in generation of a plurality of digital values representing amplitudes of the phase current waveforms. The method also includes performing an evaluation, by a controller, of the plurality of digital values, and generating the inverter control inputs based on the evaluation.

BRIEF DESCRIPTION OF THE DRAWINGS

Embodiments of the inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any expressed or implied theory presented in the preceding technical field, background, brief summary or the following detailed description.

Figure 4:
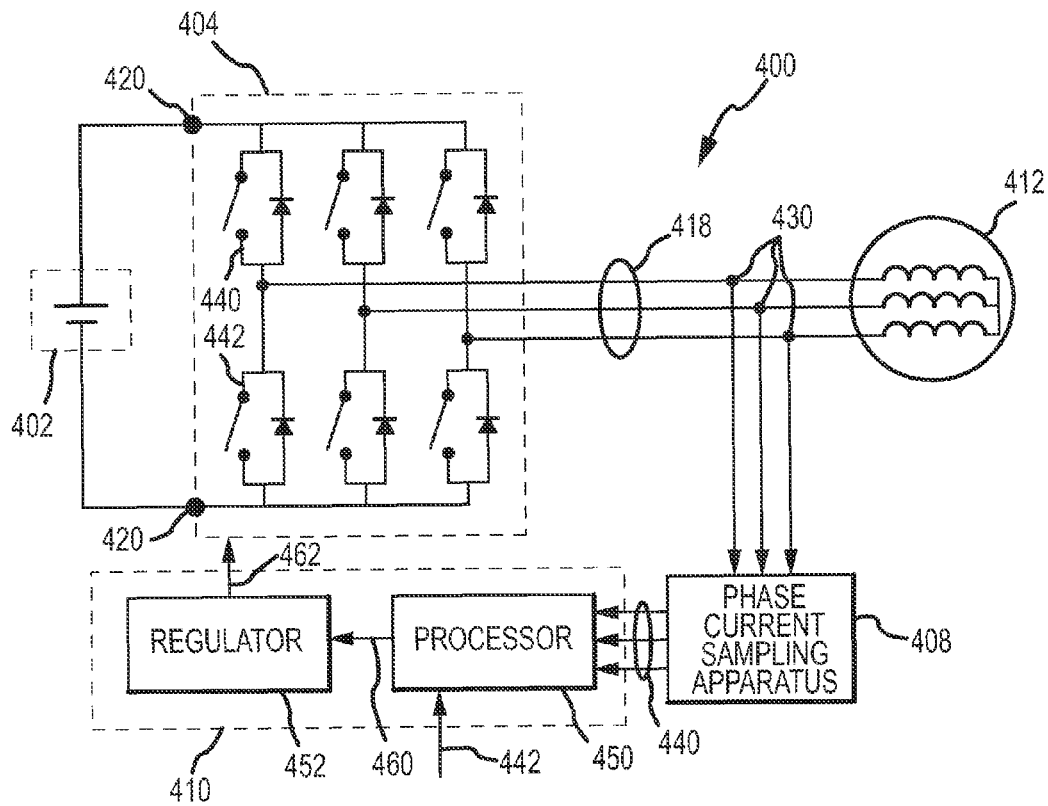
FIG. 4 illustrates a simplified schematic diagram of an electric motor drive system, in accordance with an example embodiment of the inventive subject matter.

FIG. 4 illustrates a simplified schematic diagram of an electric motor drive system 400, in accordance with an example embodiment of the inventive subject matter. System 400 includes a power source 402, an inverter 404, a phase current sampling apparatus 408, and a controller 410, which are adapted to drive an electric motor 412, in an embodiment. As will be described in more detail below, electric motor drive system 400 is adapted to generate multiple phase current waveforms 418, to sample and analyze the multiple phase current waveforms 418, and to control generation of the phase current waveforms 418 based on the sampling and analysis.

In an embodiment, system 400 is a three-phase system, in which inverter 404 generates three phase current waveforms 418, and motor 412 is a three-phase electric motor. In other embodiments, system 400 may be a two-phase system or a multiple-phase (e.g., greater than three-phase) system, and motor 412 may be appropriately adapted. Although the description herein discusses apparatus and methods adapted for a three-phase system, it is to be understood that the inventive subject matter is not intended to be limited to methods and apparatus specifically adapted for three-phase systems.

Power source 402 includes one or more rechargeable power sources (e.g., batteries or capacitors), in an embodiment. In an alternate embodiment, power source 402 may include one or more alternative power sources, such as a line power source, for example. Power source 402 generates a direct current (DC) voltage across inverter input terminals 420. The voltage may have a magnitude in a range of 100-400 V, in an embodiment, although the voltage may be higher or lower, in other embodiments.

Power source 402 is operably coupled to inverter 404 via the inverter input terminals 420. Inverter 404 includes a circuit, which is adapted to receive the voltage from power source 402 and to convert the voltage into N substantially sinusoidal fundamental phase voltage waveforms, which induce the phase current waveforms 418, where N=3, in an embodiment. In an embodiment, the phase current waveforms 418 have substantially equal phase separations with respect to each other (e.g., phase separations of about 120°).

In an embodiment, inverter 404 includes N phase legs, each of which generates a phase voltage and includes a pair of switching elements that includes an upper switching element 440 and a lower switching element 442. Each pair of switching elements 440, 442 is switched in a complementary manner between open switch states and closed switch states, and the duty cycle for the open and closed switch states is controlled by inverter control inputs 462 generated by controller 410. Accordingly, controller 410 is adapted to cause each phase leg of inverter 404 to pulse width modulate the input voltage to generate a sinusoidal (fundamental component), pulse width modulated (PWM) phase voltage waveform. Through control of the switching elements 440, 442, the amplitude, frequency, and relative phase of each of the phase current waveforms 418 is controllable, as will be described in more detail later. In an embodiment, the switching frequency of switching elements 440, 442 is a frequency in a range of about 2 kiloHertz (kHz) to about 20 kHz, although lower or higher switching frequencies may be used in other embodiments. Through control of the switching frequency of each switching element 440, 442 and the duty cycle within each phase leg, the fundamental frequency of phase current waveforms 418 is controllable within a range of 0 Hz to 2 kHz, in an embodiment, although lower or higher fundamental phase current waveform frequencies may be produced in other embodiments.

The N phase current waveforms 418 are provided to motor 412 at motor input terminals 430. In an embodiment, motor 412 is an N-phase electric motor adapted to receive N phase current waveforms, and to generate torque in response to the received phase current waveforms. For example, motor 412 may be an electric motor embodied in an electric vehicle or a hybrid electric vehicle (HEV). In other embodiments, motor 412 may be embodied in another type of system, such as an industrial system or another type of motion control system, for example.

Phase current sampling apparatus 408 and controller 410 together form a feedback and control sub-system. In an embodiment, the feedback and control sub-system is adapted to control the phase current waveforms 418 generated by inverter 404, in order to control the torque generation of motor 412. In particular, the feedback and control sub-system is adapted to sample the phase current waveforms 418, to compare characteristics of the sampled phase current waveforms with desired phase current waveform parameters, and to control the switch states of switching elements 440, 442 in response to the comparison. As used herein, the term "sample," in its verb tense, means to convert an analog waveform amplitude at a discrete time into a digital value. The term "sample," in its noun tense means a digital value that reflects an amplitude of an analog waveform at a discrete time.

In an embodiment, phase current sampling apparatus 408 includes N "sampling channels," and is adapted to receive and sample each of the phase current waveforms 418 and to generate N streams 440 of phase current waveform samples. In other words, phase current sampling apparatus 408 includes a number of sampling channels that is equal to the number of phase current waveforms 418. In a particular embodiment, N=3. In other embodiments, N may be larger or smaller than 3.

As used herein, a "sampling channel" includes circuitry (e.g., including an analog-to-digital converter) adapted to sample amplitudes of an analog phase current waveform at a plurality of sampling instants, and to generate a stream 440 of phase current waveform samples. Each stream 440 includes a plurality of digital values reflecting the sampled amplitudes of one or more phase current waveforms. An embodiment of a simplified block diagram of a phase current sampling apparatus will be described in more detail in conjunction with FIG. 5, later.

Controller 410 includes at least one processor 450, and a regulator 452, in an embodiment. Processor 450 is adapted to receive and analyze the N streams 440 of phase current waveform samples 440 (referred to herein as "measured phase current waveforms"), and to compare characteristics of the measured phase current waveforms with desired phase current waveform parameters. In an embodiment, desired phase current waveform parameters may be received from other system elements (not illustrated) via input commands 442, and these parameters may be stored in local memory or other memory that is accessible to controller 410. Desired phase current waveform parameters may include, for example, parameters regarding phase current waveform amplitude, frequency, and relative phase. Based on errors calculated between the measured phase current waveform parameters and the desired phase current waveform parameters, processor 440 generates regulator control inputs 460 adapted to reduce the errors.

Regulator 452 is adapted to receive the regulator control inputs 460 and to generate inverter control inputs 462, accordingly. The inverter control inputs 462 determine the duty cycles of the switching elements 440, 442 for each of the phase legs, thus controlling the fundamental sinusoidal component of each phase current waveform 418 and the relative phase between the phase current waveforms 418.

Figure 5:
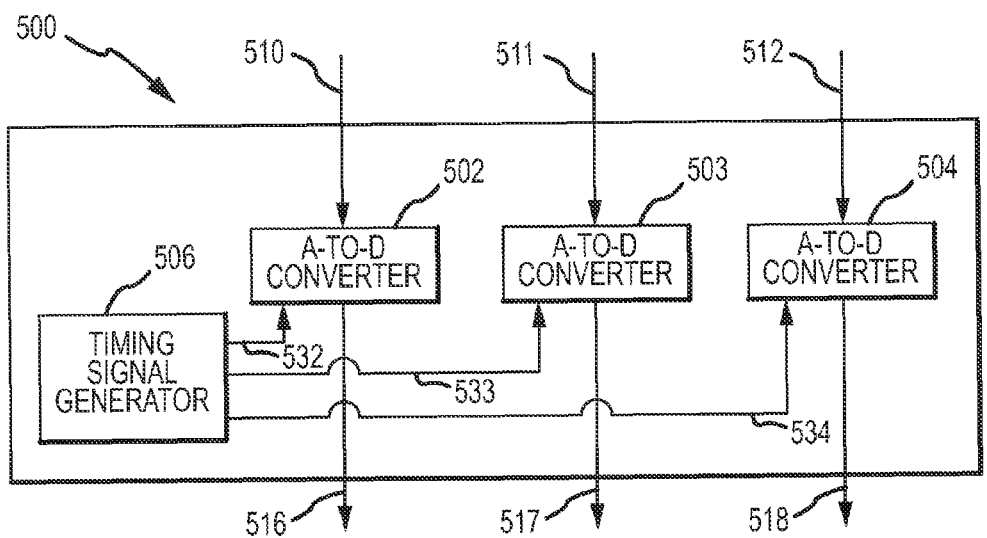
FIG. 5 illustrates a simplified schematic diagram of a phase current sampling apparatus, in accordance with an example embodiment.

FIG. 5 illustrates a simplified schematic diagram of a phase current sampling apparatus 500 (e.g., phase current sampling apparatus 408, FIG. 4), in accordance with an example embodiment. Phase current sampling apparatus 500 includes a plurality of current sensors (e.g., analog-to-digital (A-to-D) converters 502, 503, 504) and at least one timing signal generator 506, in an embodiment.

Phase current sampling apparatus 500 receives the N phase current waveforms 510, 511, 512 (e.g., phase current waveforms 418, FIG. 4), and generates multiple sets of "corresponding samples" for each of the N phase current waveforms 510-512. A set of "corresponding samples" includes samples of each of the N phase current waveforms 510-512 that are generated substantially simultaneously with a particular sampling instant. For a given set of corresponding samples, the phase current waveforms 510-512 are sampled substantially simultaneously at the sampling instant.

Each A-to-D converter 502-504 forms a portion of a sampling channel, and is adapted to sample a phase current waveform 510-512 present at its input terminal and to generate a stream 516, 517, 518 of digital waveform samples, which include the sets of corresponding samples. Three A-to-D converters 502-504 are illustrated in FIG. 5, which correspond to a particular embodiment. In other embodiments, phase current sampling apparatus may include more or fewer A-to-D converters. In addition, the three A-to-D converters 502-504 illustrated indicate A-to-D converters that are operable, in accordance with various embodiments, during a particular time period. During other time periods, alternate A-to-D converters (not illustrated) present within the system may be operable, in accordance with various embodiments.

Timing signal generator 506 is adapted to provide sample timing signals 532, 533, 534 to each A-to-D converter 502-504, which control the sampling instants at which each A-to-D converter 502-504 will sample the phase current waveform present at its input terminal.

Figure 6:
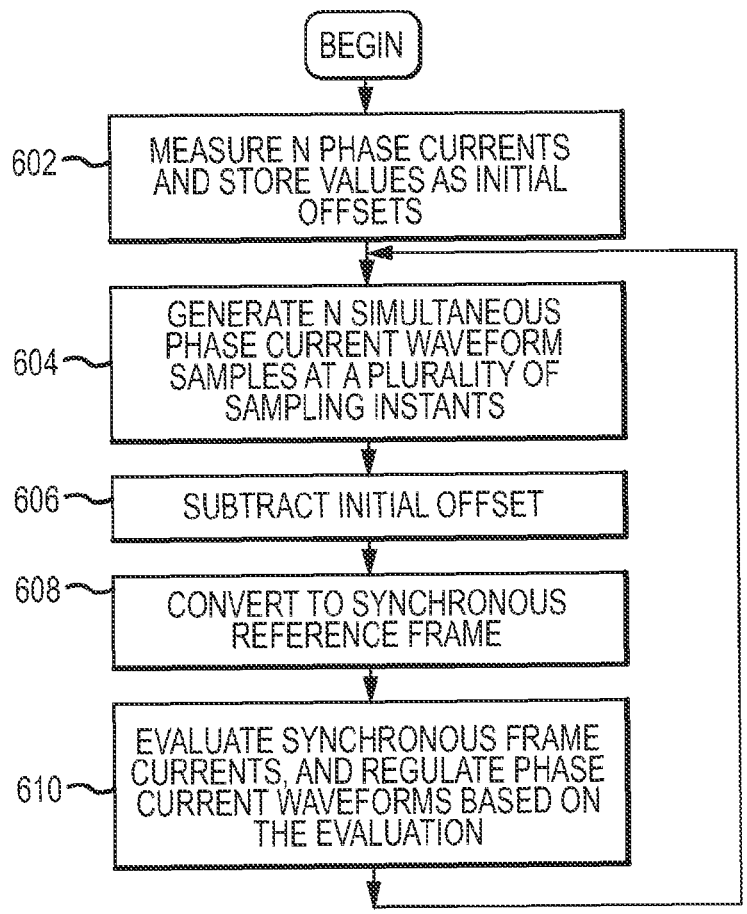
FIG. 6 illustrates a flowchart of a method for sampling and regulating phase current waveforms, in accordance with an example embodiment.

FIG. 6 illustrates a flowchart of a method for sampling and regulating phase current waveforms, in accordance with an example embodiment. The method may be performed, for example, by portions of an electric motor drive system, such as various embodiments of the electric motor drive system and portions thereof discussed previously in conjunction with FIGS. 4 and 5. The method may be carried out by hardware, software, firmware, and/or various combinations thereof, in various embodiments. It is to be understood that, although the method is represented as a linear sequence of process steps, some of the process steps may be performed in parallel with other process steps, in various embodiments.

In an embodiment, the method may begin prior to motor operations. For example, the method may begin, in block 602, by measuring some or all of the N phase currents to produce one or more values representing an initial offset current, $i_{offset}$. These one or more values, which indicate the initial current conditions of the current sensors, may be stored for later use.

During operations, the method may continue, in block 604, by generating N substantially simultaneous phase current waveform samples at a plurality of sampling instants, where N is the number of phase current waveforms being regulated. As discussed previously, the N substantially simultaneous phase current waveform samples may be generated by N current sensors (e.g., A-to-D converters 502-504, FIG. 5). For example, each of three A-to-D converters (e.g., A-to-D converters 502-504, FIG. 5) may simultaneously receive sample timing signals (e.g., sample timing signals 532-534, FIG. 5), and in response, each A-to-D converter may generate a sample of the phase current waveform (e.g., phase current waveforms 510-512, FIG. 5) present at its input terminal. The N phase current waveform samples produced during each sampling instant may be output in parallel within N streams of digital waveform samples (e.g., streams 516-518, FIG. 5).

In block 606, the initial offset current, $i_{offset}$, may be subtracted from each of the N phase current waveform samples to produce N, initial offset adjusted, phase current waveform samples.

Figure 8:
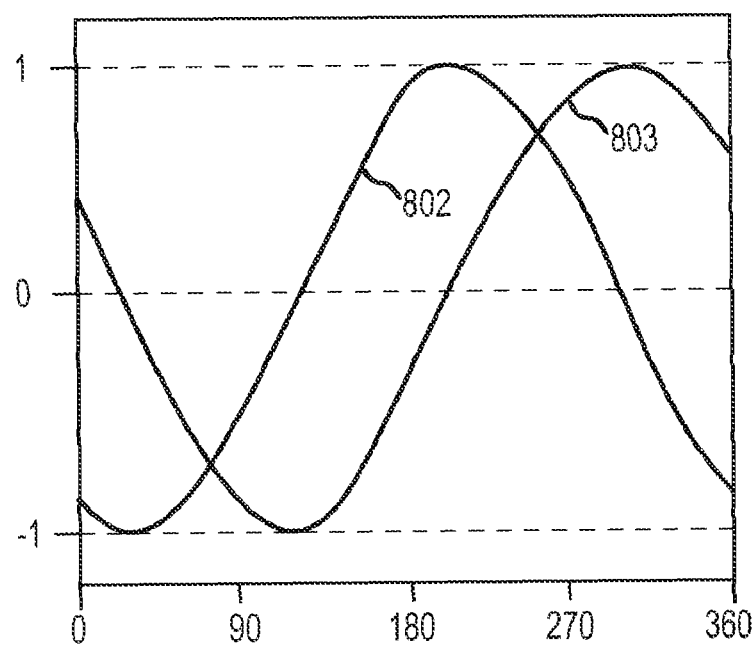
FIG. 8 is a chart illustrating reference frame currents, $i_\alpha$ and $i_\beta$, which are calculated based on the sampled phase currents illustrated in FIG. 7, in accordance with an example embodiment.
Figure 9:
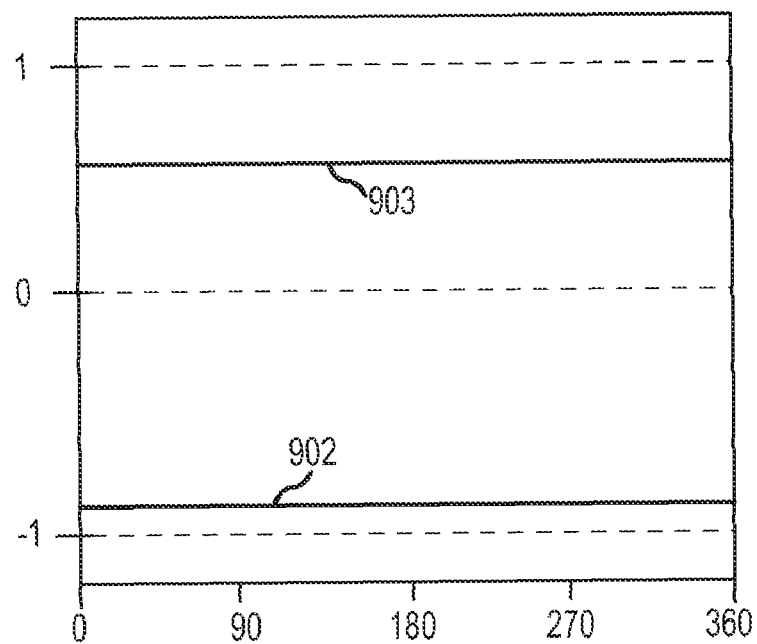
FIG. 9 is a chart illustrating synchronous frame currents, $i_d$ and $i_q$, which are calculated based on the reference frame currents illustrated in FIG. 8, in accordance with an example embodiment.

In block 608, a plurality of offset adjusted, phase current waveform samples for each of the phase currents are converted into a synchronous reference frame to produce synchronous frame currents, $i_d$ and $i_q$ (e.g., synchronous frame currents 902, 903, FIG. 9). For example, Equ. 3 and Equ. 4 (Background) may be used to convert the plurality of sets of phase current waveform samples into synchronous frame currents, in an embodiment. In other embodiments, other mathematical derivations may be used to convert the phase current waveform samples. As will be described and illustrated in more detail in conjunction with FIGS. 7-9, implementation of embodiments of the inventive subject matter may result in the calculation of synchronous frame currents that more accurately reflect the actual phase currents than the synchronous frame currents produced using traditional methods and apparatus.

In block 610, the synchronous frame currents are evaluated, and the phase current waveforms are regulated, based on the evaluation. For example, in an embodiment, non-fundamental components (e.g., fluctuations) in the synchronous frame currents may be characterized, and regulator control inputs (e.g., regulator control inputs 460, FIG. 4) and/or inverter control inputs (e.g., inverter control inputs 452, FIG. 4) may be produced to attempt to regulate the non-fundamental components out of the phase current waveforms. The method may then iterate as shown.

Figure 1:
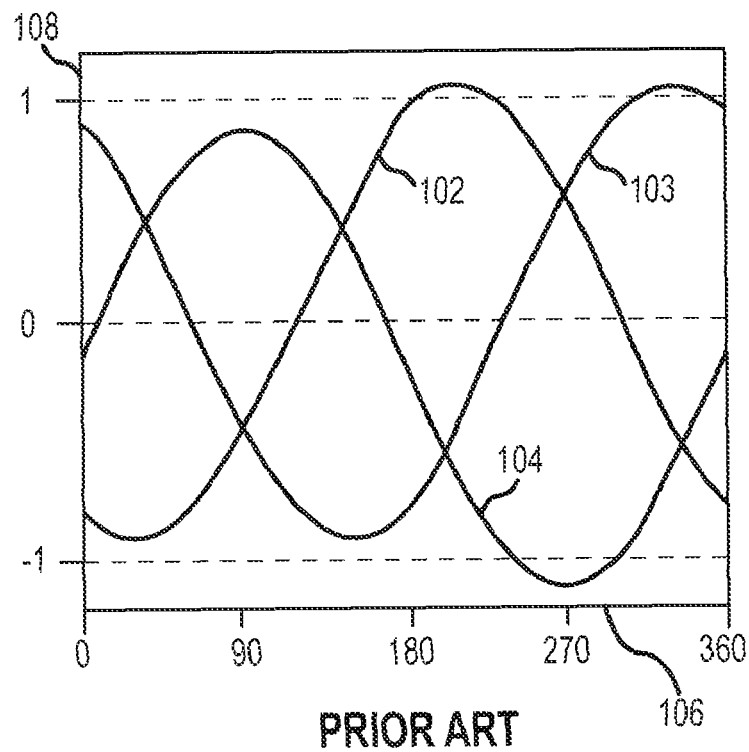
FIG. 1 is a chart illustrating three, sinusoidal phase currents.
Figure 7:
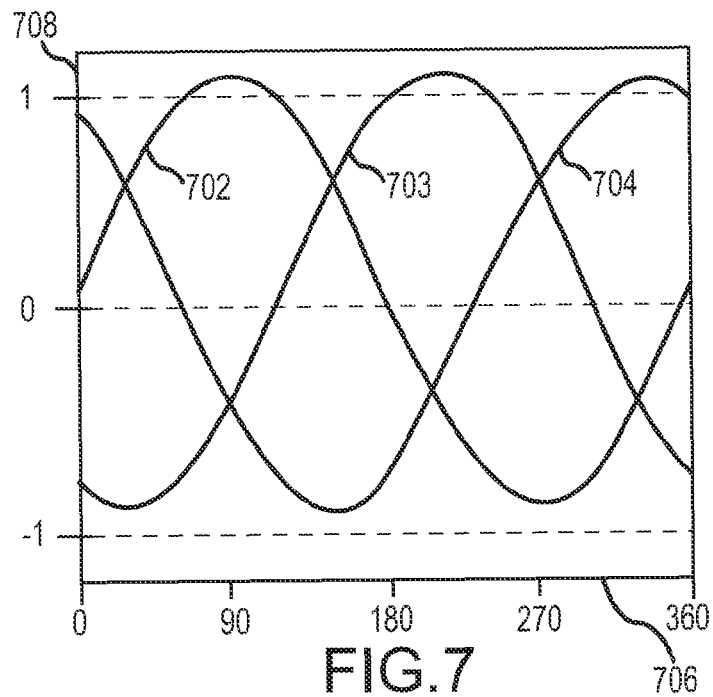
FIG. 7 is a chart illustrating three, sinusoidal phase currents sampled in accordance with an example embodiment.

FIG. 7 is a chart illustrating three, sinusoidal phase currents 702, 703, 704, sampled in accordance with an example embodiment. Axis 706 represents electrical position, in degrees, and axis 708 represents amplitude. Phase current 702 may represent a measured phase a current, $i_a$, phase current 703 may represent a measured phase b current, $i_b$, and phase current 704 may represent a measured phase c current, $i_c$. In FIG. 7, about a 5% positive offset drift is shown to be present in the measured values for the phase a and b currents, 702, 703, as indicated by the upwardly shifted position of the phase a and b currents 702, 703. Because the phase c current 704 also is a measured quantity, rather than a calculated quantity, the phase c current 704 also reflects the 5% positive offset drift, rather than a negative offset drift that results from erroneous approximations of the phase c current using traditional methods (e.g., using Equ. 2) and apparatus, as is reflected in the chart of FIG. 1. Accordingly, erroneous approximations of the phase c current, which may result from the calculation of the phase c current in the presence of a significant offset drift, may be avoided using embodiments of the inventive subject matter. An accurate measurement of the phase c current yields a more accurate representation of the reference frame currents 802, 803, $i_\alpha$ and $i_\beta$, as is illustrated in FIG. 8, which in turn yields a more accurate representation of the synchronous frame currents 902, 903, $i_d$ and $i_q$, as is illustrated in FIG. 9.

Figure 2:
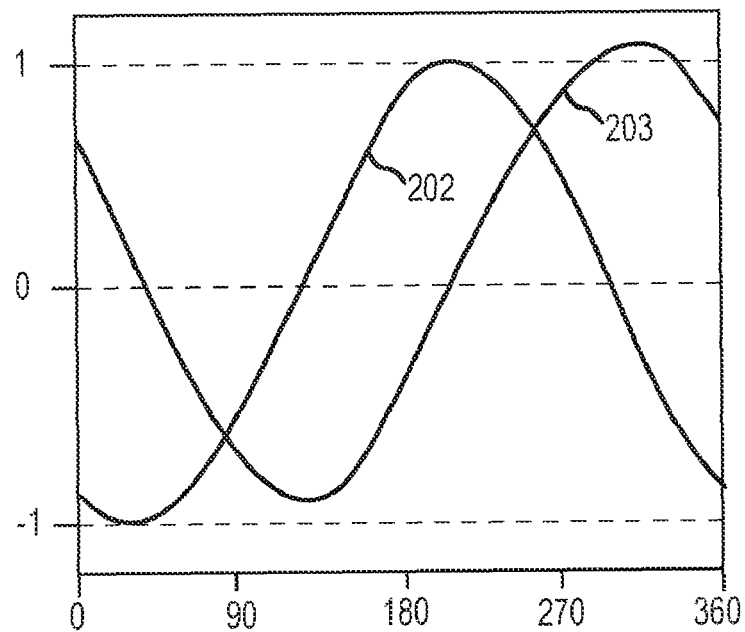
FIG. 2 is a chart illustrating reference frame currents, $i_\alpha$ and $i_\beta$, which are calculated based on the measured and calculated phase currents illustrated in FIG. 1.

FIG. 8 is a chart illustrating reference frame currents 802, 803, $i_\alpha$ and $i_\beta$, respectively, which are calculated based on the measured phase currents 702-704 illustrated in FIG. 7 (e.g., using Equ. 3, Background). A comparison between FIG. 2 and FIG. 8 illustrates that, using embodiments of the inventive subject matter, the reference frame currents 802, 803 do not include the wobble present in the reference frame currents 202, 203 illustrated in FIG. 2.

FIG. 9 is a chart illustrating synchronous frame currents 902, 903, $i_d$ and $i_q$, respectively, which are calculated based on the reference frame currents 802, 803 illustrated in FIG. 8 (e.g., using Equ. 4, Background). A comparison between FIG. 3 and FIG. 9 illustrates that, using embodiments of the inventive subject matter, the synchronous frame currents 902, 903, are significantly closer to being DC quantities than are the synchronous frame currents 302, 303 calculated using traditional methods and apparatus, even in the presence of a presence of a significant offset drift.

Figure 3:
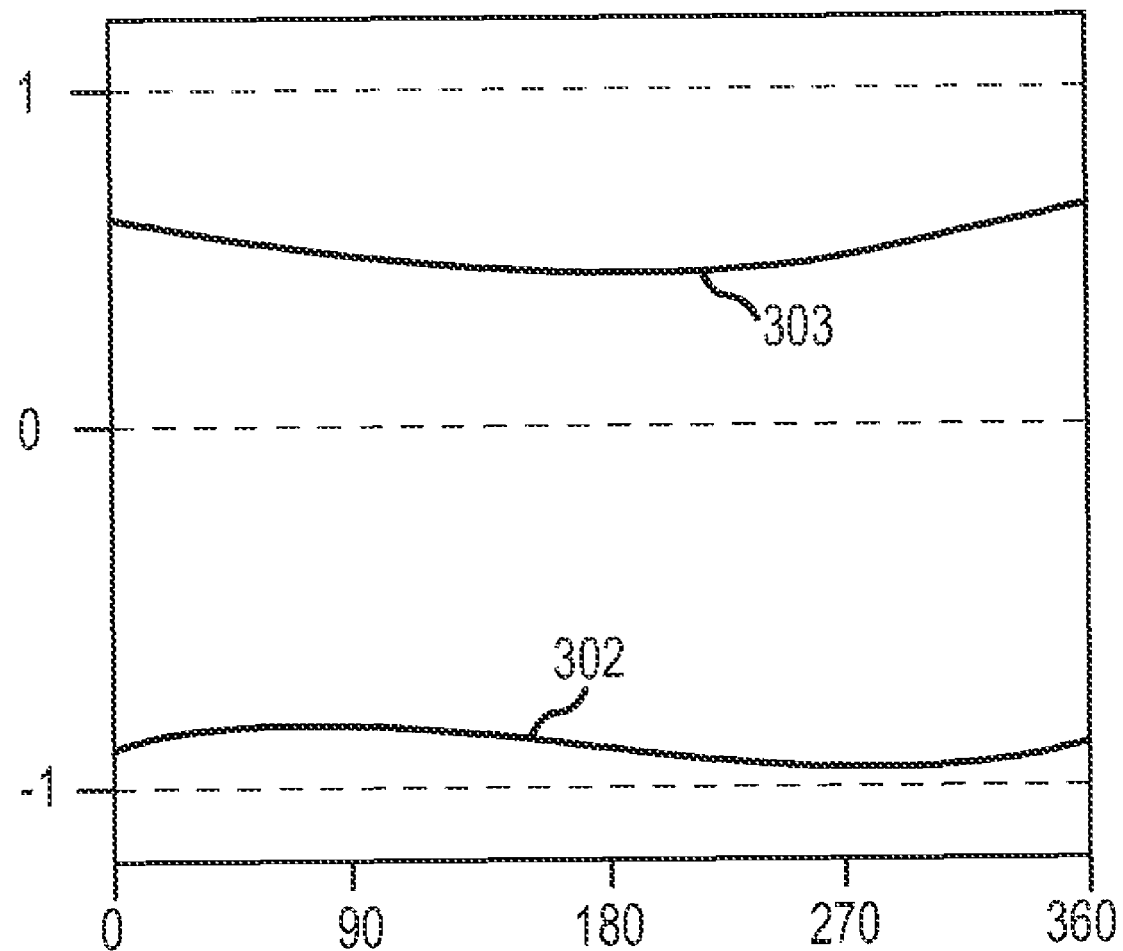
FIG. 3 is a chart illustrating synchronous frame currents, $i_d$ and $i_q$, which are calculated based on the reference frame currents illustrated in FIG. 2.

Because the non-fundamental component in the synchronous frame currents (e.g., as illustrated in FIG. 3) that may be produced using traditional methods and apparatus are non-existent when embodiments of the inventive subject matter are implemented, inaccuracies due to phase c current calculations will not be reflected back into the actual phase currents during regulation. Accordingly, using embodiments of the inventive subject matter, torque ripple that may otherwise occur in traditional systems due to inaccurate phase c current calculations may be avoided using embodiments of the inventive subject matter. Ultimately, embodiments of the inventive subject matter may yield higher system performance than may be achieved using traditional methods and apparatus.

Embodiments of the inventive subject matter may be incorporated into any of a number of systems that include one or more electric motors. For example, but not by way of limitation, embodiments of the inventive subject matter may be implemented in motor vehicle applications in which one or more electric motors are used to provide torque to other vehicle components, such as electric motor vehicles and hybrid electric vehicles (HEVs).

Figure 10:
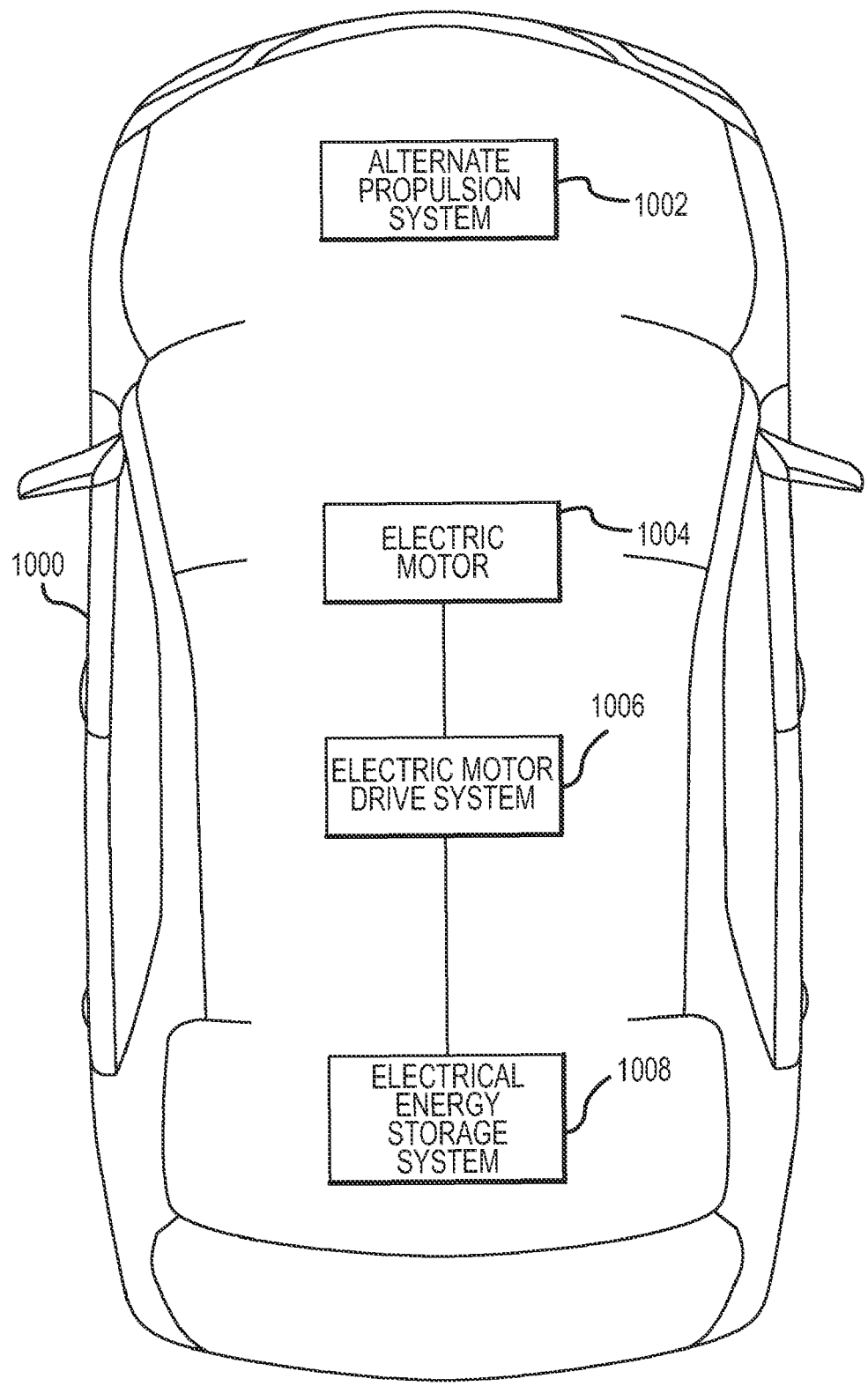
FIG. 10 illustrates a simplified diagram of an electric motor drive system installed in a hybrid electric vehicle, in accordance with an example embodiment.

FIG. 10 illustrates a simplified diagram of an electric motor drive system installed in an HEV 1000, in accordance with an example embodiment of the inventive subject matter. Vehicle 1000 includes an internal combustion engine, fuel cell, flex fuel engine, or other alternate propulsion system 1002, at least one electric motor 1004, at least one electric motor drive system 1006, and one or more electrical energy storage systems 1008 (e.g., batteries or supercapacitors). The alternate propulsion system 1002 and electric motor 1004 may alternatively or simultaneously provide torque to the drive train and/or other components (not illustrated) of vehicle 1000. In an all-electric vehicle, the alternate propulsion system 1002 may be excluded. Electrical energy storage system 1008 may form a portion of a rechargeable energy storage system adapted to provide energy at least to the electric motor drive system 1006.

Electric motor drive system 1006 includes one or more embodiments of the inventive subject matter, as discussed herein. Accordingly, electric motor drive system 1006 is adapted to generate multiple phase current waveforms, to sample and analyze the multiple phase current waveforms, and to control generation of the phase current waveforms based on the sampling and analysis. This, in turn, will affect the torque produced by electric motor 1004.

Along with motor vehicle applications, embodiments of the inventive subject matter also may be implemented in a variety of other types of systems in which multiple phase currents are sampled and evaluated in the process of phase current regulation. For example, but not by way of limitation, embodiments of the inventive subject matter may be implemented in industrial applications, and/or other types of motion control applications. Accordingly, such implementations and embodiments are intended to be included within the scope of the inventive subject matter.

While at least one exemplary embodiment has been presented in the foregoing detailed description, it should be appreciated that a vast number of variations exist. Further, although various system components have been illustrated to be electrically, physically or operatively coupled to certain other system components and/or to form portions of certain sub-systems (e.g., a phase current sampling apparatus or a system controller), it is to be understood that some system components may be electrically, physically or operatively coupled in other ways than the above described and illustrated embodiments, and/or the system components may form portions of other sub-systems, and/or the system components may not be associated with any particular sub-system (e.g., they may be discrete components).

The exemplary embodiments are only examples, and are not intended to limit the scope, applicability, or configuration of the inventive subject matter in any way. Rather, the foregoing detailed description will provide those skilled in the art with a convenient road map for implementing the exemplary embodiment or exemplary embodiments. It should be understood that various changes can be made in the function and arrangement of elements without departing from the scope of the inventive subject matter as set forth in the appended claims and the legal equivalents thereof.

What is claimed is:

1. An electric motor drive system comprising:
   an inverter adapted to generate, based on inverter control inputs, a total number, N, of phase current waveforms, and to provide the N phase current waveforms to a same number, N, of motor input terminals;
   a phase current sampling apparatus having the same number, N, of current sensors, wherein each of the N current sensors is adapted to receive one of the N phase current waveforms that are provided to the N motor input terminals, and wherein the N current sensors are adapted simultaneously to sample the N phase current waveforms and to generate N digital values representing amplitudes of the N phase current waveforms; and
   a controller adapted to receive the N digital values representing the amplitudes of the N phase current waveforms, to perform an evaluation of the N digital values, and to generate the inverter control inputs based on the evaluation, wherein the controller is adapted to perform the evaluation, at least in part, by determining reference frame currents as a function of all of the N digital values, and wherein the controller is further adapted to measure the phase current waveforms prior to motor operations to produce initial offsets, and to store the initial offsets.

2. The electric motor drive system of claim 1, wherein the controller is adapted to perform the evaluation by converting the N digital values into synchronous frame currents, and by evaluating the synchronous frame currents.

3. The electric motor drive system of claim 2, wherein the controller is adapted to convert the N digital values into the synchronous frame currents by performing the steps of:
   converting the N digital values into the reference frame currents by applying an equation:

$$\begin{bmatrix} i_\beta \\ i_\alpha \end{bmatrix} = 2/3 \begin{bmatrix} 0 & \frac{\sqrt{3}}{2} & \frac{-\sqrt{3}}{2} \\ 1 & \frac{-1}{2} & \frac{-1}{2} \end{bmatrix} \begin{bmatrix} i_a \\ i_b \\ i_c \end{bmatrix}$$

where $i_\alpha$ is a first reference frame current, $i_\beta$ is a second reference frame current, $i_a$ is a first phase current represented by a first one of the N digital values, $i_b$ is a second phase current represented by a second one of the N digital values, and $i_c$ is a third phase current represented by a third one of the N digital values; and
   converting the reference frame currents into the synchronous frame currents.

4. The electric motor drive system of claim 1, wherein the controller is further adapted to subtract the initial offsets from the N digital values during the process of performing the evaluation.

5. The electric motor drive system of claim 1, wherein the plurality of current sensors includes three current sensors.

6. The electric motor drive system of claim 1, wherein the inverter comprises the same number, N, of phase legs, wherein each of the phase legs generates one of the phase current waveforms and includes a pair of switching elements that includes an upper switching element and a lower switching element.

7. The electric motor drive system of claim 1, wherein the controller comprises:
   a processor adapted to receive the N digital values representing the amplitudes of the phase current waveforms, to perform the evaluation, and to generate regulator control inputs based on the evaluation; and
   a regulator adapted to receive the regulator control inputs and to generate the inverter control inputs based on the regulator control inputs.

8. A motor vehicle comprising:
   an electric motor adapted to receive a total number, N, of phase current waveforms at a same number, N, of motor input terminals, and to provide torque in response to the N phase current waveforms; and
   an electric motor drive system having
      an inverter adapted to generate, based on inverter control inputs, a same number, N, of phase current waveforms, and to provide the N phase current waveforms to the N motor input terminals, a phase current sampling apparatus having the same number, N, of current sensors, wherein each of the N current sensors is adapted to receive one of the N phase current waveforms that are provided to the N motor input terminals, and wherein the N current sensors are adapted simultaneously to sample the N phase current waveforms and to generate N digital values representing amplitudes of the N phase current waveforms, and a controller adapted to receive the N digital values representing the amplitudes of the N phase current waveforms, to perform an evaluation of the N digital values, and to generate the inverter control inputs based on the evaluation, wherein the controller is adapted to perform the evaluation, at least in part, by determining reference frame currents as a function of all of the N digital values, and wherein the controller is further adapted to measure the phase current waveforms prior to motor operations to produce initial offsets, and to store the initial offsets.

9. The motor vehicle of claim 8, wherein the controller is adapted to perform the evaluation by converting the N digital values into synchronous frame currents, and by evaluating the synchronous frame currents.

10. The motor vehicle of claim 8, wherein the electric motor is adapted to receive three phase current waveforms.

11. The motor vehicle of claim 8, further comprising:
an alternate propulsion system adapted to provide torque alternatively to or simultaneously with the electric motor.

12. A method for regulating phase current waveforms performed by an electric motor drive system, the method comprising the steps of:
an inverter generating, based on inverter control inputs, a total number, N, of phase current waveforms, and providing the N phase current waveforms to a same number, N, of motor input terminals;
generating, by a same number, N, of current sensors, the same number, N, of simultaneous phase current waveform samples at a plurality of sampling instants, resulting in generation of a same number, N, of digital values representing amplitudes of the N phase current waveforms;
performing an evaluation, by a controller, of the N digital values, wherein the controller is adapted to perform the evaluation, at least in part, by determining reference frame currents as a function of all of the N digital values;
generating the inverter control inputs based on the evaluation;
measuring the N phase current waveforms prior to motor operations to produce initial offsets; and
storing the initial offsets.

13. The method of claim 12, wherein performing the evaluation comprises the steps of:
converting the N digital values into synchronous frame currents; and
performing the evaluation based on the synchronous frame currents.

14. The method of claim 13, wherein converting the N digital values into the synchronous frame currents comprises the steps of:
converting the N digital values into the reference frame currents by applying an equation:

$$\begin{bmatrix} i_\beta \\ i_\alpha \end{bmatrix} = 2/3 \begin{bmatrix} 0 & \frac{\sqrt{3}}{2} & \frac{-\sqrt{3}}{2} \\ 1 & \frac{-1}{2} & \frac{-1}{2} \end{bmatrix} \begin{bmatrix} i_a \\ i_b \\ i_c \end{bmatrix}$$

where $i_\alpha$ is a first reference frame current, $i_\beta$ is a second reference frame current, $i_a$ is a first phase current represented by a first one of the N digital values, $i_b$ is a second phase current represented by a second one of the N digital values, and $i_c$ is a third phase current represented by a third one of the N digital values; and
converting the reference frame currents into the synchronous frame currents.

15. The method of claim 14, wherein converting the reference frame currents into the synchronous frame currents comprises the step of applying an equation:

$$\begin{bmatrix} i_d \\ i_q \end{bmatrix} = \begin{bmatrix} \cos\theta_e & \sin\theta_e \\ -\sin\theta_e & \cos\theta_e \end{bmatrix} \begin{bmatrix} i_\alpha \\ i_\beta \end{bmatrix}$$

Where $i_d$ is a first synchronous frame current, $i_q$ is a second synchronous frame current, $i_\alpha$ is a first reference frame current, and $i_\beta$ is a second reference frame current.

16. The method of claim 12,
wherein the step of performing the evaluation includes subtracting the initial offsets from the N digital values.

17. A method for regulating phase current waveforms performed by an electric motor drive system, the method comprising the steps of:
an inverter generating, based on inverter control inputs, a number, N, of phase current waveforms;
generating, by a same number, N, of current sensors, the same number, N, of simultaneous phase current waveform samples at a plurality of sampling instants, resulting in generation of a plurality of digital values representing amplitudes of the phase current waveforms;
performing an evaluation, by a controller, of the plurality of digital values by:
converting the plurality of digital values into synchronous frame currents by converting the plurality of digital values into reference frame currents by applying an equation:

$$\begin{bmatrix} i_\beta \\ i_\alpha \end{bmatrix} = 2/3 \begin{bmatrix} 0 & \frac{\sqrt{3}}{2} & \frac{-\sqrt{3}}{2} \\ 1 & \frac{-1}{2} & \frac{-1}{2} \end{bmatrix} \begin{bmatrix} i_a \\ i_b \\ i_c \end{bmatrix}$$

10 where $i_\alpha$ is a first reference frame current, $i_\beta$ is a second reference frame current, $i_a$ is a first phase current, $i_b$ is a second phase current, and $i_c$ is a third phase current,
converting the reference frame currents into the synchronous frame currents, and
performing the evaluation based on the synchronous frame currents; and
generating the inverter control inputs based on the evaluation.

* * * * *